(12) United States Patent
Seo et al.

(10) Patent No.: US 7,136,727 B2
(45) Date of Patent: Nov. 14, 2006

(54) METHOD FOR CONTROLLING HYBRID ELECTRIC VEHICLE POWERTRAIN

(75) Inventors: Nobuhide Seo, Hiroshima (JP); Akira Takemoto, Aki-gun (JP); Kazuho Douzono, Higashihiroshima (JP); Takuji Kawada, Canton, MI (US)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/393,416

(22) Filed: Mar. 30, 2006

(65) Prior Publication Data

US 2006/0224282 A1 Oct. 5, 2006

(30) Foreign Application Priority Data

Mar. 31, 2005 (JP) ............................. 2005-101943
Mar. 29, 2006 (JP) ............................. 2006-091770

(51) Int. Cl.
*B60L 9/00* (2006.01)
*B60K 1/00* (2006.01)

(52) U.S. Cl. .......................... 701/22; 701/101; 701/54; 180/65.2; 180/65.4

(58) Field of Classification Search .................. 701/22, 701/48, 101, 102, 103, 115, 53, 54; 60/698, 60/706, 710; 180/65.2, 65.3, 65.4; 290/40 C
See application file for complete search history.

(56) References Cited

U.S. PATENT DOCUMENTS

| | | | |
|---|---|---|---|
| 6,164,400 A * | 12/2000 | Jankovic et al. | ............ 180/65.2 |
| 6,173,574 B1 | 1/2001 | Obayashi et al. | |
| 6,600,980 B1 | 7/2003 | Kraska et al. | |
| 6,702,053 B1 | 3/2004 | Nogi et al. | |
| 6,714,852 B1 * | 3/2004 | Lorenz et al. | .............. 701/102 |
| 6,718,939 B1 * | 4/2004 | Iwasaki et al. | ............. 123/319 |
| 6,823,840 B1 | 11/2004 | Tamai et al. | |
| 6,847,877 B1 * | 1/2005 | Homeyer | ..................... 701/51 |
| 6,962,224 B1 * | 11/2005 | Nakanowatari | ........... 180/65.2 |
| 2002/0163199 A1 | 11/2002 | Ramaswamy et al. | |

FOREIGN PATENT DOCUMENTS

GB       2386932 A      10/2003

OTHER PUBLICATIONS

Shinichi Abe, HEV control—Performance improvement of New Prius, Engine Technology, Jun. 26, 2004, pp. 28-33, Jun. 2004 issue Sankaido, Japan.
European Search Report for European Patent Application No. 06006742, Jul. 7, 2006.

\* cited by examiner

*Primary Examiner*—Richard M. Camby

(57) ABSTRACT

There is described a method for controlling a hybrid electric vehicle power-train comprising an internal combustion engine, an electric machine and a transmission, the transmission having a gear set with three rotational elements rotationally coupled to the internal combustion engine, the electric machine and the vehicle driving wheel, a rotational speed of any one of the three rotational elements being mechanically defined by the rotational velocity of the remainder of the three rotational elements. The method comprises adjusting the torque of the electric machine to change the speed of the internal combustion engine and to control the velocity of the electric machine above a predetermined value, and decreasing the torque of the internal combustion engine while substantially maintaining the intake manifold pressure of the internal combustion engine in response to a decrease in the demanded engine output. The method may advantageously improve both of the engine efficiency and the power transmission efficiency, then may improve the operating efficiency of the overall power-train system having the internal combustion engine and the transmission coupling the engine, the electric machine and the driving wheels.

20 Claims, 9 Drawing Sheets

METHOD FOR CONTROLLING HYBRID ELECTRIC VEHICLE POWERTRAIN

BACKGROUND

This description relates to generally a hybrid electric vehicle (HEV), and more particularly relates method for controlling HEV power-train.

Hybrid electric vehicle and its power-train configuration are well known and presented in such as U.S. Pat. No. 6,702,053 and a Japanese magazine article "Shinichi ABE, HEV Control—Performance improvement of New Prius, ENGINE TECHNOLOGY, June 2004 issue", where an internal combustion engine, a first electric machine and vehicle driving wheels are rotationally coupled through a power transmission system, such as a planetary gear set, having three rotational elements such as a planetary carrier connected to the internal combustion engine, a sun gear connected to the first electric machine and a ring gear connected to the driving wheels. In addition to that, a second electric machine is rotationally coupled to the driving wheels with a fixed speed reduction ratio.

The operation of this type of HEV power-train can be illustrated by the relationship of rotational velocities between its three rotational elements. The relationship can be expressed as a collinear diagram as shown in FIG. 4, where the velocities of the three elements always sit on an operational collinear line $L_C$ which changes its position and orientation based on torque balance acting on the three elements. Engine torque $T_{ENG}$ is transferred through the planetary carrier to the sun gear and the ring gear in a fixed torque split ratio ($T_{ES}/T_{ER}$=constant) defined by number of teeth of the planetary gear set. FIG. 4 shows a so-called positive torque split mode, where the engine is controlled to generate desired output power at a desired engine speed at an operating point where less fuel is consumed (i.e. an efficient operating point). The desired engine speed can be achieved, based on the collinear relationship in FIG. 4, by controlling the first electric machine to operate as an electric generator. This allows the first electric machine to brake the sun gear by resisting the torque $T_{ES}$ transferred from the engine to the sun gear and generate electricity. Note that the ring gear velocity directly corresponds to the driving wheel velocity, so it can be considered fixed. In general, the electricity generated by the first electric machine is used for driving the second electric machine that is operated as a motor to supplement the torque $T_{ER}$ transferred from the engine to the ring gear. In other words, all of the power generated by the engine may be transmitted to the driving wheels.

On the other hand, the efficiency of the positive power-split mode may be reduced, when the desired power at the driving wheels is low particularly at a low vehicle speed. During these conditions, the desired engine power may not be coincident with efficient engine operating conditions. For example, an engine can have a lower speed constraint to ensure that engine vibration and combustion stability are acceptable. The engine operates efficiently at this speed when the engine torque is at a particular level. However, if the desired engine torque is less than this level, the engine torque can be reduced to match the desired level, but at the expense of engine efficiency. The '053 patent describes a method to improve engine efficiency while operating in the positive power-split mode by changing the air-fuel ratio, thereby moving the efficient engine operating point toward a lower torque side while keeping the lower engine speed constraint. However, this method does not recognize another problem occurring during a high speed cruising where demanded torque is low but speed is high, as described below.

In addition to the positive power-split mode, a so-called a negative power-split mode may occur during the high speed cruising. At this condition, engine speed is lowered to meet the low power requirement of the driving wheels. The engine speed is reduced, as shown by a dotted collinear line $L_C$ of FIG. 5, by rotating the first electric machine in an opposite direction to that in the positive mode (i.e. a negative velocity). The first electric machine achieves a negative velocity by rotating against the torque $T_{ES}$ transferred from the engine. Therefore, the first electric machine needs to operate as a motor and to consume power that is typically supplied from the second electric machine. Consequently, the second electric machine is operated as an electric generator in this mode. Further, the torque $T_{ES}$, a part of the torque generated by the engine and transferred to the sun gear, is never transmitted to the driving wheels but is dissipated by the first electric machine that is driving the sun gear and using energy. Also, a part of the torque $T_{ER}$ transferred from the engine to the ring gear is used by the second electric machine generating the energy (electricity) to drive the first electric machine (energy re-circulation), which leads to reduced power transmission efficiency.

The ENGINE TECHNOLOGY article describes a method to improve the reduced efficiency in the negative power-split mode by selecting an engine operating point (e.g., engine torque and speed) that takes into account both the engine operating efficiency and the power transmission efficiency. Specifically, the method moves the engine operating point toward a higher speed and a lower torque, so as to reduce the amount of energy circulating by decreasing speed of the first electric machine.

Although this method attempts to lower the amount of energy circulating through the system and to improve the power-train efficiency by reducing the speed of the first electric machine, it also can lower the engine operating efficiency because the engine operates at a condition where engine pumping losses may be increased. In other words, the method exchanges the engine efficiency for the power transmission efficiency and therefore leaves room additional system efficiency improvement.

The inventors herein have recognized the above described disadvantages of the prior arts and need to improve of the system efficiency of the hybrid electric vehicle power-train over the above described prior arts.

SUMMARY

Accordingly, in one aspect of the present description, there is provided a method for controlling a hybrid electric vehicle power-train comprising an internal combustion engine, an electric machine and a transmission, the transmission having a gear set with three rotational elements rotationally coupled to the internal combustion engine, the electric machine and the vehicle driving wheel, a rotational speed of any one of the three rotational elements being mechanically defined by the rotational velocity of the remainder of the three rotational elements. The method comprises adjusting the torque of the electric machine to change the speed of the internal combustion engine and to control the velocity of the electric machine above a predetermined value, and decreasing the torque of the internal combustion engine, such as by reducing fuel into the engine, while substantially maintaining the intake manifold pressure of the internal combustion engine, for example within a range of 0.1 bar from a most fuel efficient point of the engine, in response to a decrease in the demanded engine output, such as by making an air fuel ratio leaner, increasing an exhaust gas recirculation or adjusting intake or exhaust valve profile.

In accordance with the method, by adjusting the torque of the electric machine to change the speed of the internal combustion engine and to control the velocity of the electric machine above a predetermined value, the electric machine may be controlled to operate as a generator not as a motor but even if so its extent may be smaller because of the velocity of the electric machine above the predetermined value so as to limit the negative power-split mode and the energy re-circulation. Simultaneously by decreasing the torque of the internal combustion engine while substantially maintaining the intake manifold pressure of the internal combustion engine in response to a decrease in the demanded engine output, such as making air fuel ratio in a combustion chamber to be leaner, re-introducing exhaust gas into the intake system of the engine or changing intake or exhaust valve operating profile, the engine may operate more efficiently at the given engine speed derived from the velocity of the electric machine because of the maintained intake manifold pressure. Accordingly the method may advantageously improve both of the engine efficiency and the power transmission efficiency, then may improve the operating efficiency of the overall power-train system having the internal combustion engine and the transmission coupling the engine, the electric machine and the driving wheels.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
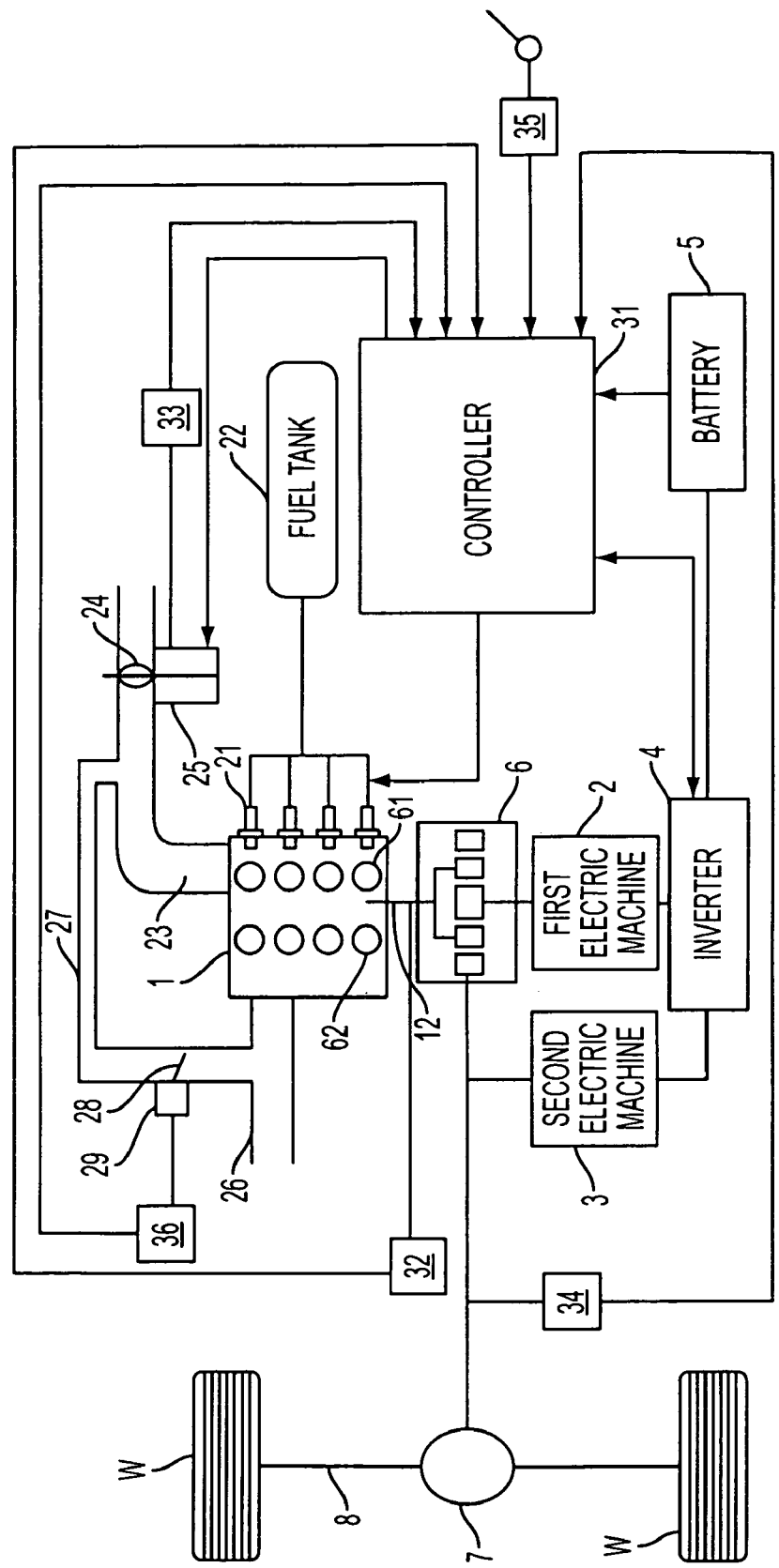
FIG. 1 is a schematic illustration of a power-train system of hybrid electric vehicle (HEV power-train) in accordance with an embodiment of the present description.

In FIG. 1, there is illustrated a schematic representation showing an overall power-train system of a hybrid electric vehicle having an internal combustion engine 1, a first electric machine (motor/generator) 2 and a second electric machine (motor/generator) 3. The first and second electric machines 2 and 3 are electrically connected with each other through an inverter 4 which is also connected to a high voltage battery 5. The internal combustion engine 1 and the first and second electric machines 2 and 3 are also mechanically coupled through a power transmission (split) mechanism 6, or in this embodiment as an example a planetary gear set, which eventually delivers driving power to driving wheels W through a differential gear set 7 and drive shafts 8.

Figure 2:
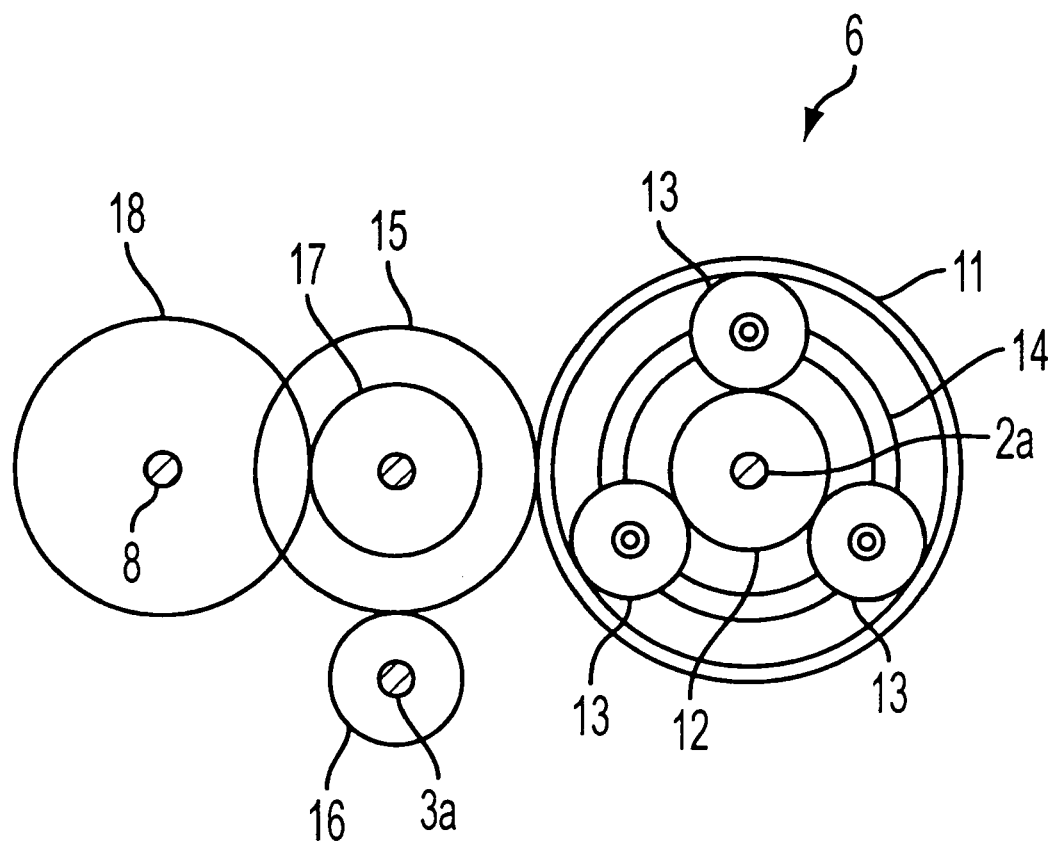
FIG. 2 is a schematic illustration of a power transmission mechanism of the HEV power-train including a planetary gear set in accordance with the embodiment of the present description.

In FIG. 2, there is shown a more detailed representation illustrating the planetary gear set 6 and related rotational elements. The planetary gear set 6 is comprised of a ring gear 11, a sun gear 12 arranged inside of the ring gear 11 and planetary gears 13 rotationally supported on a planetary carrier 14, engaging with both of the ring gear 11 and sun gear 12 and orbiting the outer perimeter of the sun gear 12 and the inner perimeter of the ring gear 11.

The output shaft 1a of the engine 1 is coaxially connected to the planetary carrier 14. The output shaft 2a of the first electric machine 2 is coaxially connected to the sun gear 12. The ring gear 11 engages with a counter gear 15 which engages with a pinion gear 16 that is coaxially connected to the output shaft 3a of the second electric machine 3. The counter gear 15 has a transmission gear 17 rotate together with it, which rotationally engages with a differential gear 18 that drives the driving wheels W through the differential gear set 7 and the drive shafts 8. Although the above mentioned power transmission mechanism uses the planetary gear set, instead a bevel gear type or any other type of gear sets appropriate to achieve the same functionality may be used.

The first and second electric machines 2 and 3 are constructed as a synchronous motor/generator having a rotor with permanent magnets arranged on its outer periphery and stators having three phase coils forming rotational magnetic field and wound thereon. Each of the three-phase coils is individually connected to the inverter 4. When the three phase coils receive electricity controlled by the inverter, the electric machine operates as a motor generating a positive torque. On the other hand, when the rotor is forcibly rotated, it operates as a generator which generates electricity and a negative torque.

Referring back to FIG. 1, the internal combustion engine 1, combusts fuel supplied from a fuel tank 22 through a known fuel delivery system and fuel injectors 21 each of which is assigned to each of combustion chambers or cylinders, in this embodiment, four cylinders. The fuel supplied to the engine 1 may be gasoline, diesel fuel, ethanol, hydrogen or any other fuel appropriate to combust and generate power. A throttle valve 24 is arranged in an intake passage or manifold 23 which is actuated by a throttle actuator 25 and regulates air inducted into the engine 1. There is arranged an exhaust gas re-circulation (EGR) passage 27 extending from an exhaust passage or manifold 26 to the intake air passage 23 to reintroduce or re-circulate a part of the exhaust gas from the engine 1 into it. The EGR flow rate is controlled by an EGR control valve 28 which is actuated by an EGR actuator 29.

The power-train further comprises a microprocessor based controller 31 to control the inverter 4, the fuel injectors 21, the throttle actuator 25, the EGR actuator 29 and other actuators described below or known in the art based on signals from an engine speed sensor 32, a throttle opening sensor 33, a vehicle speed sensor 34, an accelerator position sensor 35, an EGR valve position sensor 36 and other sensors described below or known in the art.

Figure 3:
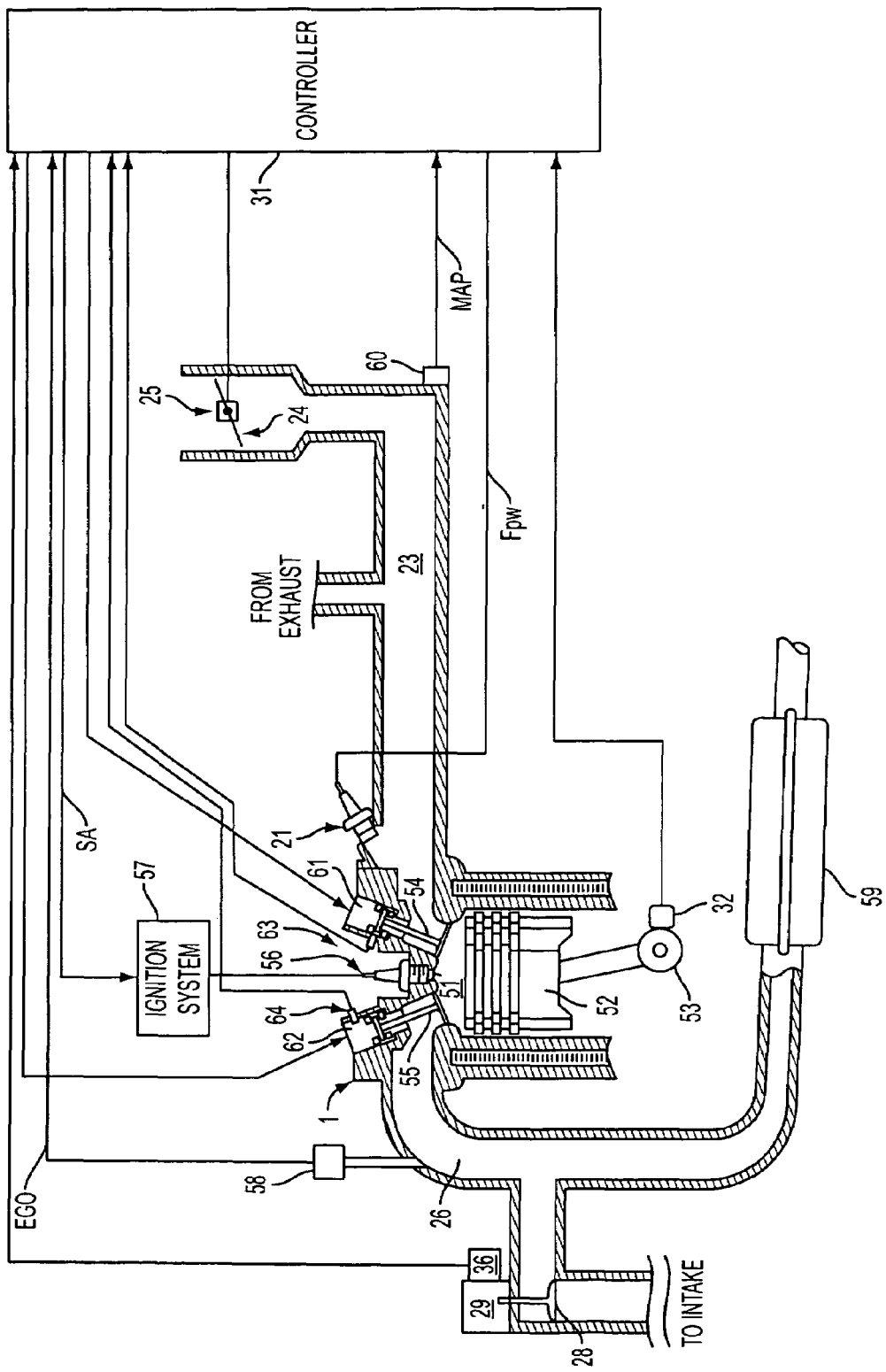
FIG. 3 is a more detailed illustration of the internal combustion engine, a part of the HEV power-train illustrated in FIG. 1.

Referring to FIG. 3, there is shown a more detailed configuration of the internal combustion engine 1, which comprises four cylinders, although only one is shown here, each of which accommodates a combustion chamber 51 defined by a cylinder wall and a piston 52 connected to a crankshaft 53 or the output shaft 1*a* described above. The combustion chamber 51 communicates with the intake manifold 23 through an intake valve 54 and to the exhaust manifold 26 through an exhaust valve 55. In FIG. 3, fuel injected by the injector 21 arranged to face the intake port of the intake manifold 23 may be inducted into the combustion chamber 51. Alternatively the injector 21 may be arranged facing inside of the combustion chamber 51 to directly inject fuel into the combustion chamber as known in the art as a direct injection engine. In any case the injector 21 injects fuel with the amount corresponding to a pulse width signal FPW which the controller 31 outputs based on the various sensor signals as later described in more detail. The controller 31 may output the signals FPW individually to the injector 21 and even may shut off fuel into a specific cylinder 51 while continuing the fuel supply into the rest of the cylinders 51. The fuel inducted or injected into the combustion chamber 51 is ignited by a spark plug 56 which is sparked by an ignition system 57 such as distributor-less igniters well known in the art controlled with a signal SA from the controller 31 based on the engine operating condition determined from the various sensor signals input thereto. Exhaust gas may flow from the combustion chamber 51 through the exhaust valve 55 to the exhaust gas passage 26 where an exhaust gas sensor, such as an exhaust gas oxygen (EGO) sensor, a universal exhaust gas oxygen sensor (UEGO) and a heated exhaust gas oxygen sensor (HEGO) well known in the art, detects the exhaust gas content and outputs a signal EGO to the controller 31 which also receives a signal MAP from a manifold air pressure sensor 60 arranged in the intake air passage 23 and determines fuel injection amount at the injector 21 and sends the signal FPW appropriate for exhaust gas purification at a catalytic converter 59 located downstream of the exhaust gas sensor 58 based on the various signals including the signals EGO and MAP.

In the present embodiment, the intake and exhaust valves 54 and 55 are respectively actuated by electromagnetic actuators 61 and 62 having such as a structure with an armature connected to a valve stem and opening and closing coils arranged respectively at each side of the armature as known in the art. Positions of the intake and exhaust valves 54 and 55 are detected by valve position sensors 63 and 64 which send valve position signals to the controller 31 that generates control signals of the actuators 61 and 62 based on the valve position signals and the other sensor signals. By using the electromagnetic valve actuators 61 and 62, timing and lift of opening of the valves 54 and 55 may be fully controlled independently from a rotational angle of the crankshaft 53. Also it may be fully individually controlled for an individual cylinder 51 among the multiple cylinders such as four in this embodiment. The electromagnetic valve actuators may even enable it to hold the valves 54, 55 closed so that an individual cylinder may be deactivated if combined with an individual fuel cut off. However, a variable cam timing mechanism or variable valve lift mechanism on a conventional camshaft drive system or any other valve drive mechanism able to vary the valve timing and/or lift or even a conventional camshaft drive system with no variable valve timing feature may be employed in embodiments of the present description in stead of the electromagnetic valve drive mechanism described above as being recognized by a person having ordinary skill in the art.

There now will be described an operation of the hybrid electric vehicle power-train in FIGS. 1 through 3. As known in the art, by the inherent characteristic of the planetary gear set 6, when rotational velocities of the two among the three rotational shafts of the ring gear 11, the sun gear 12 and the carrier 14 are determined, a rotational velocity of the remaining one of the three rotational shafts is automatically determined. Particularly in this embodiment, the rotational velocities of sung gear 12 and carrier 14 respectively correspond to rotational velocity of the first electric machine 2 and the engine 1. A relationship among a velocity $N_{M1}$ of the first electric machine 2, a velocity $N_{ENG}$ of the engine 1 and a velocity $N_R$ of the ring gear 11 which linearly corresponds to a vehicle velocity can be expressed by the following equation:

$$N_{M1}+(Z_R/Z_S)\times N_R-(1+Z_R/Z_S)\times N_{ENG}=0 \qquad (1)$$

Where $Z_R$ is number of teeth of the ring gear 11 and $Z_S$ is number of teeth of the sun gear 12.

Figure 4:
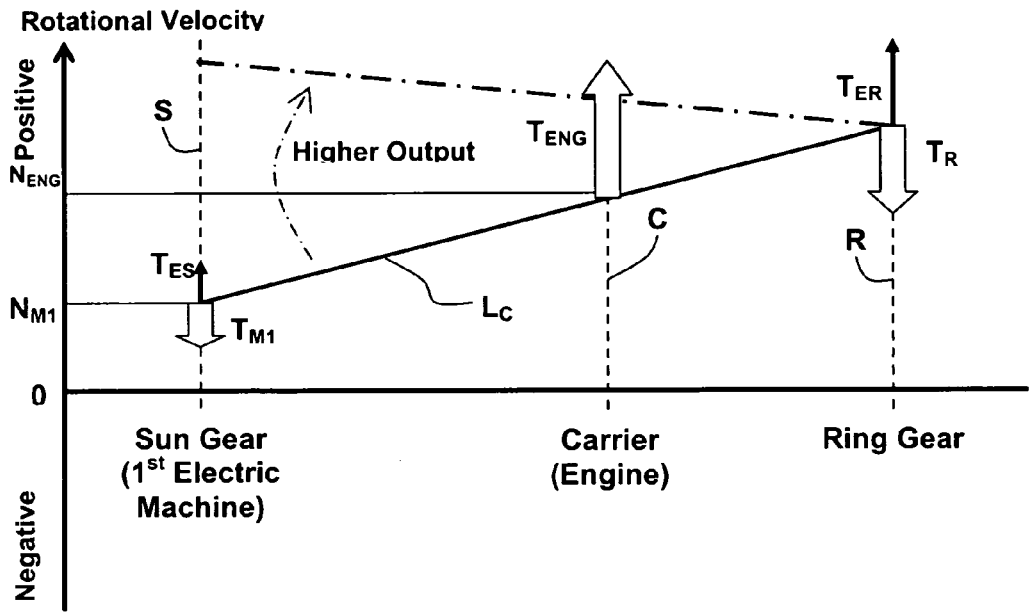
FIG. 4 is a collinear diagram illustrating a relationship of rotational velocities among the three rotational elements of the planetary gear set of the present embodiment as well as its torque distribution characteristic during a normal driving condition or a positive power-split mode.

This relationship can also be expressed by a collinear diagram as shown in FIG. 4, which shows an operational collinear diagram at a normal driving condition or a positive power-split mode of the hybrid electric vehicle where the engine 1 generates torque $T_{ENG}$ which is split through the carrier 14 into the sun gear 12 and the ring gear 11, the first electric machine 2 operates as a generator with a part of the engine torque $T_{ES}$ distributed through the sun gear and generates electricity. The electricity generated by the first electric machine drives the second electric machine 3 which operates as an electric motor and generates torque that is merged with another part of torque $T_{ER}$ from the engine 1 through the ring gear 11 and together drives the driving wheels W through the gears including the counter gear 15. A relationship of the above torque $T_{ENG}$, $T_{ES}$ and $T_{ER}$ can be expressed by the following equations:

$$T_{ES}=[Z_S/(Z_R+Z_S)]\times T_{ENG} \qquad (2)$$

$$T_{ER}=[Z_R/(Z_R+Z_S)]\times T_{ENG} \qquad (3)$$

A vertical axis of the collinear diagram of FIG. 4 indicates a rotational velocity of the each rotational shaft and vertical lines S, C and R indicate a relationship of gear ratios between the three rotational shafts. In the collinear diagram, the rotational velocity $N_{M1}$ of the first electric machine 2 or the sun gear 12 is plotted on the vertical line S, the rotational velocity $N_{ENG}$ of the engine 1 or the carrier 14 is plotted on the vertical line C, and the rotational velocity $N_R$ of the ring gear 11 which is linearly corresponds to a rotational speed of the second electric machine 3 is plotted on the vertical line R. In theory, when rotational speeds of three rotational shafts of a planetary gear set are plotted in the foregoing relationship, the three plots are necessarily aligned on a one single straight line or in FIG. 4 an operational collinear $L_C$, thereby rotational speeds of the two rotational shafts tells a rotational speed of the remaining one rotational shaft. An arrow $T_{ENG}$ indicates torque which the engine 1 generates and acts on the carrier 14, and an arrow $T_{M1}$ indicates torque which the first electric machine generates and acts on the sun gear 12. The upward direction of the each arrow shows a forward direction of the torque applied on the driving wheels.

In theory, a planetary gear set has a characteristic that if a torque of the each rotational shaft is replaced with force acting on the operational collinear, an orientation of the operational collinear line $L_C$ as a solid body is balanced at a steady operational condition. That is, when torque acted on the carrier 14 by the engine 1 is indicated as torque $T_{ENG}$ acting on the operational collinear line $L_C$ upwardly, the torque $T_{ENG}$ is divided into torque $T_{ES}$ on the line S and torque $T_{ER}$ on the line R. Accordingly, to balance the orientation of the operational collinear $L_C$, toque $T_{M1}$ to be applied on the sun gear 12 from the first electric machine should have the same amplitude as and opposite direction to the torque $T_{ES}$, and reaction torque $T_R$ to be applied on the ring gear 11 should have the same amplitude as and opposite direction to the torque $T_{ER}$. The reaction torque $T_R$ will correspond to a difference between running resistance at the wheels W and driving power generated by the second electric machine 3.

During normal driving condition, as seen in FIG. 4, the first electric machine 2 operates as a generator since the rotational direction can be called positive and the acting direction of the torque $T_{M1}$ can be called negative then the can be called opposite to each other. The second electric machine 3 operates as a motor to supplement the driving power at the wheels W if the battery 5 may not be charged with the electricity generated by the first electric machine 2 or the second electric machine 3. Note that, at a higher load, electricity from the battery 5 may be supplied to the second electric machine 3.

By increasing the torque $T_{M1}$ or the electricity generated by the first electric machine 2, the left side of the collinear line $L_C$ will be rotated downwardly because of the imbalance of torques $T_{M1}$ and $T_{ES}$ on the line S while the right end stands still if the reaction torque $T_R$ does not change or the second electric machine 3 does not change its operating state, that is the velocity $N_{M1}$ of the sun gear 12 or the first electric machine 2 will be decreased. Correspondingly the velocity $N_{ENG}$ of the carrier 14 or the engine 1 will be decreased because of the rotation of the collinear line $L_C$ around its right end so as to decrease the power distributed from the engine 1 to the wheels W because of the smaller reduction ratio of the speeds. On the other hand, by decreasing the torque $T_{M1}$, the power from the engine 1 to the wheels W increases.

Figure 5:
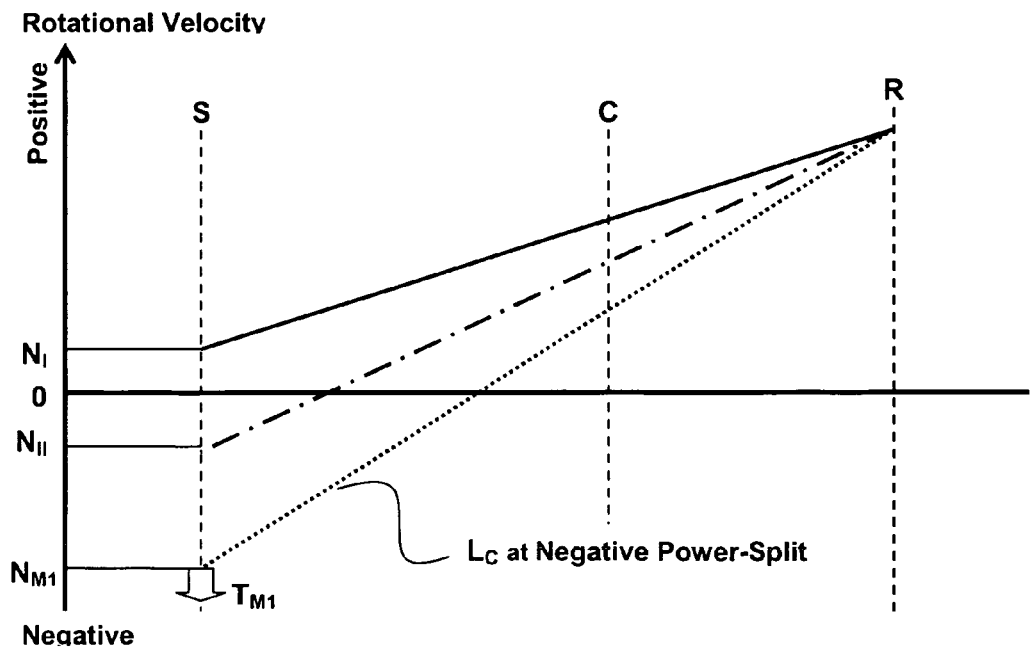
FIG. 5 is a collinear diagram showing relationships of the rotational velocities of the three elements of the planetary gear set at a negative power-split mode (dotted line) and under corrected modes of operations in accordance with an embodiment of the present description (solid-line and dot-dashed line)
Figure 6:
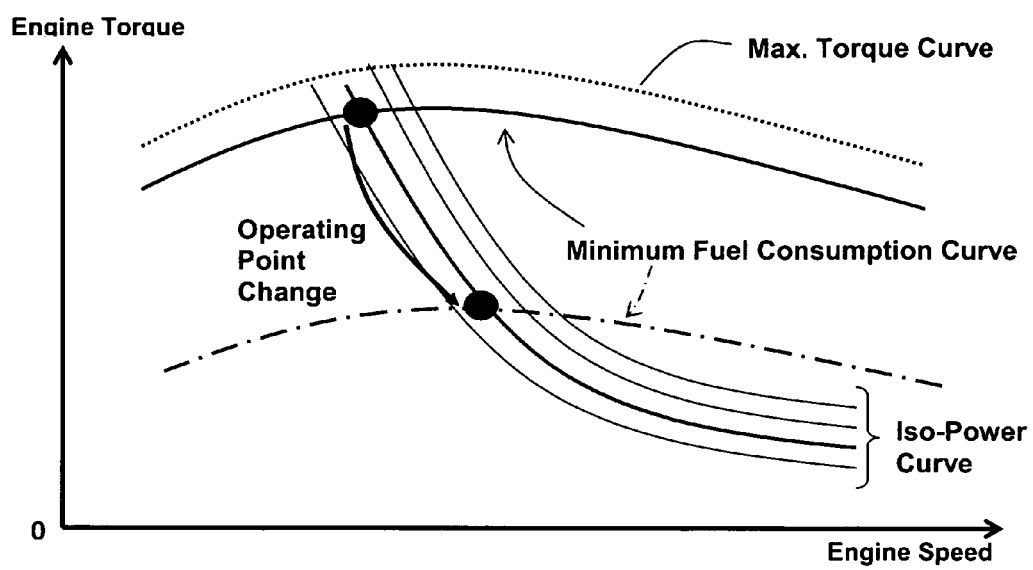
FIG. 6 is a diagram depicting engine performance curves and illustrating a correction of the curves in accordance with an embodiment of the present description.

FIG. 5 is another collinear diagram showing a cruising state particularly a high speed cruising, where a load on the HEV power-train is low because the vehicle speed is constant, which means the engine speed is low relative to the vehicle speed since the engine power required is low if the engine torque may not be varied much as well as a higher efficient operating point is at a relatively low engine speed region on an iso-power curve of the engine, most preferably also on a minimum fuel consumption curve as shown in FIG. 6. In this situation, lower speed of the carrier 14 corresponding to the lower speed of the engine 1 decreases the velocity of the sun gear 12 beyond zero, in other words it turns to be negative from positive, which means that the sun gear 12 now rotates in the opposite direction to that in FIG. 4. Accordingly, since the rotational direction and the acting direction of the torque $T_{M1}$ of the first electric machine 2 are same, it operates as a motor and consumes electric energy in proportion to a product of the torque $T_{M1}$ and the rotational speed $N_{M1}$. The second electric machine 3 operates as a generator and generates the electric energy to be consumed by the first electric machine 2 that just compensates the part of the torque $T_{ES}$ from the engine 1 and generates no driving power at the wheels W. This situation is called energy circulation or negative power split which is shown by a dotted collinear line $L_C$ in FIG. 5.

The controller 31, as known in the art, has a memory storing a program and data and a microprocessor executing instructions included in the program based on the data in the memory and the inputs from the various sensors described above, to output control signals including signals to the inverter 4, the fuel injectors 21, the throttle actuator 25, the EGR actuator 29, the ignition system 57 and the valve actuators 61 and 62. The data stored in the controller 31 includes sets of operating parameters for a range of operating conditions which may achieve the best efficiency of the overall HEV power-train at the given conditions. The operating parameters may include a desired driving torque $T_{dW}$ at the driving wheels W, a desired torque $T_{dM1}$ and a desired velocity $N_{dM1}$ of the first electric machine 2, a desired torque $T_{dM2}$ of the second electric machine 3 and engine related parameters including a desired engine speed $N_{dENG}$ and a desired engine torque $T_{dENG}$ of the engine 1, a desired throttle opening TVOd, a desired air fuel ratio λd and desired EGR amount (a desired opening of the EGR valve 28).

The program stored in the controller 31 may include desired power setting instructions to set a desired power $P_{dHEV}$ [kW] from the HEV power-train based on a vehicle speed VSP from the vehicle speed sensor 34 and an accelerator position a from the accelerator position sensor 35, second electric machine torque setting instructions to control the inverter 4 so that the second electric machine 3 generates the desired torque $T_{dM2}$ determined and stored in the memory, throttle opening control instructions to control the throttle actuator 25 to achieve the desired throttle opening TVOd, fuel control instructions to calculate the pulse width of the signal FPW to the injectors 21, EGR control instructions to control the EGR actuator 29, valve actuation control instructions to control the valve actuators 61 and 62, and other instructions to achieve the best efficiency of the HEV power-train at a given operating condition.

Figure 7:
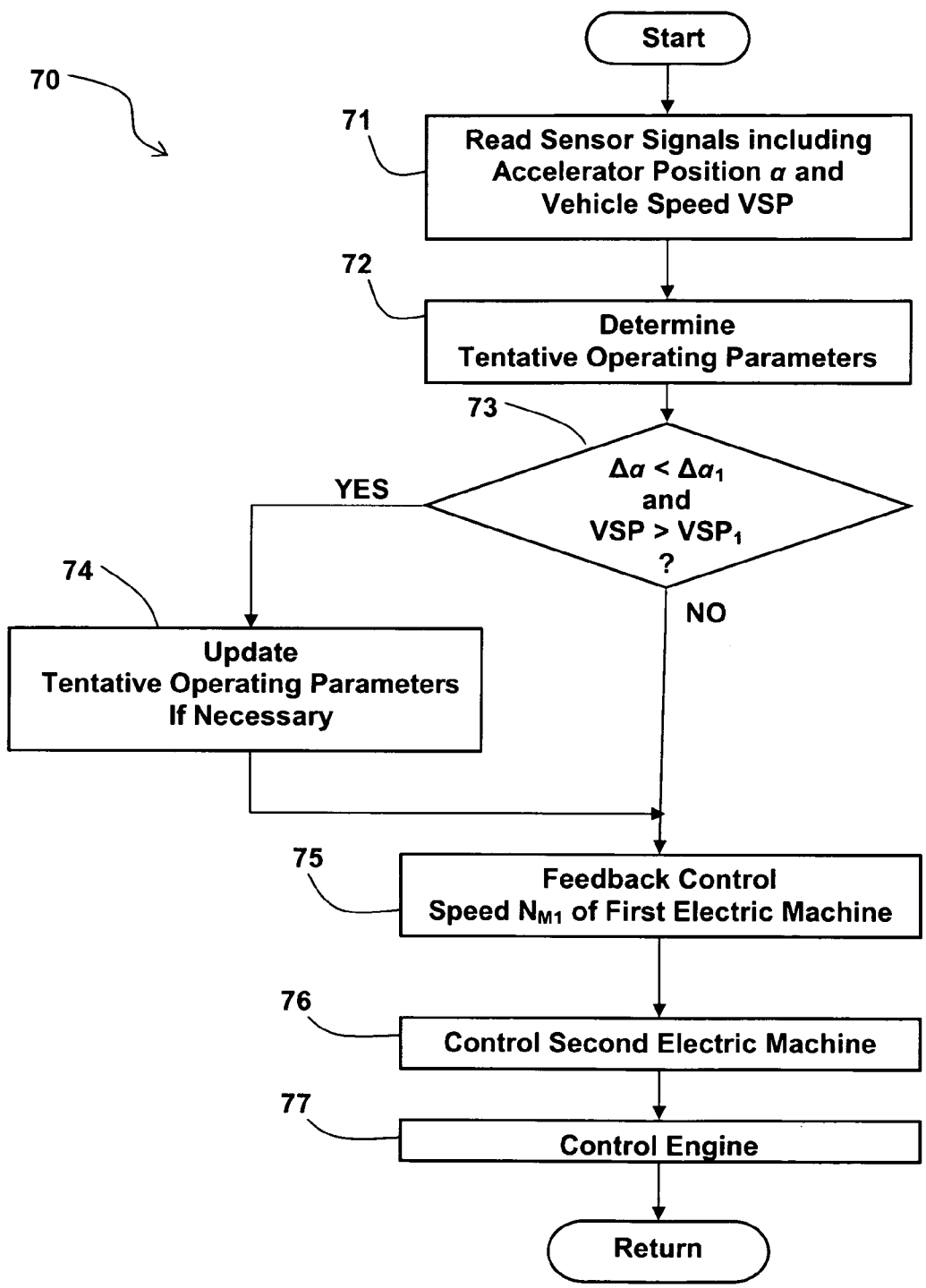
FIG. 7 is a flowchart illustrating a main routine of a control of the HEV power-train in accordance with an embodiment of the present description.

FIG. 7 shows a flowchart illustrating a control routine 70 to optimize the efficiency of the HEV power-train. The routine 70 starts with a step 71 where it reads the various sensor signals described above including accelerator position a detected by the accelerator position sensor 35 and vehicle speed VSP detected by the vehicle speed sensor 34. Then it proceeds to a step 72 where it determines tentative operating parameters of the HEV power-train based on the various parameters as described below.

Figure 8:
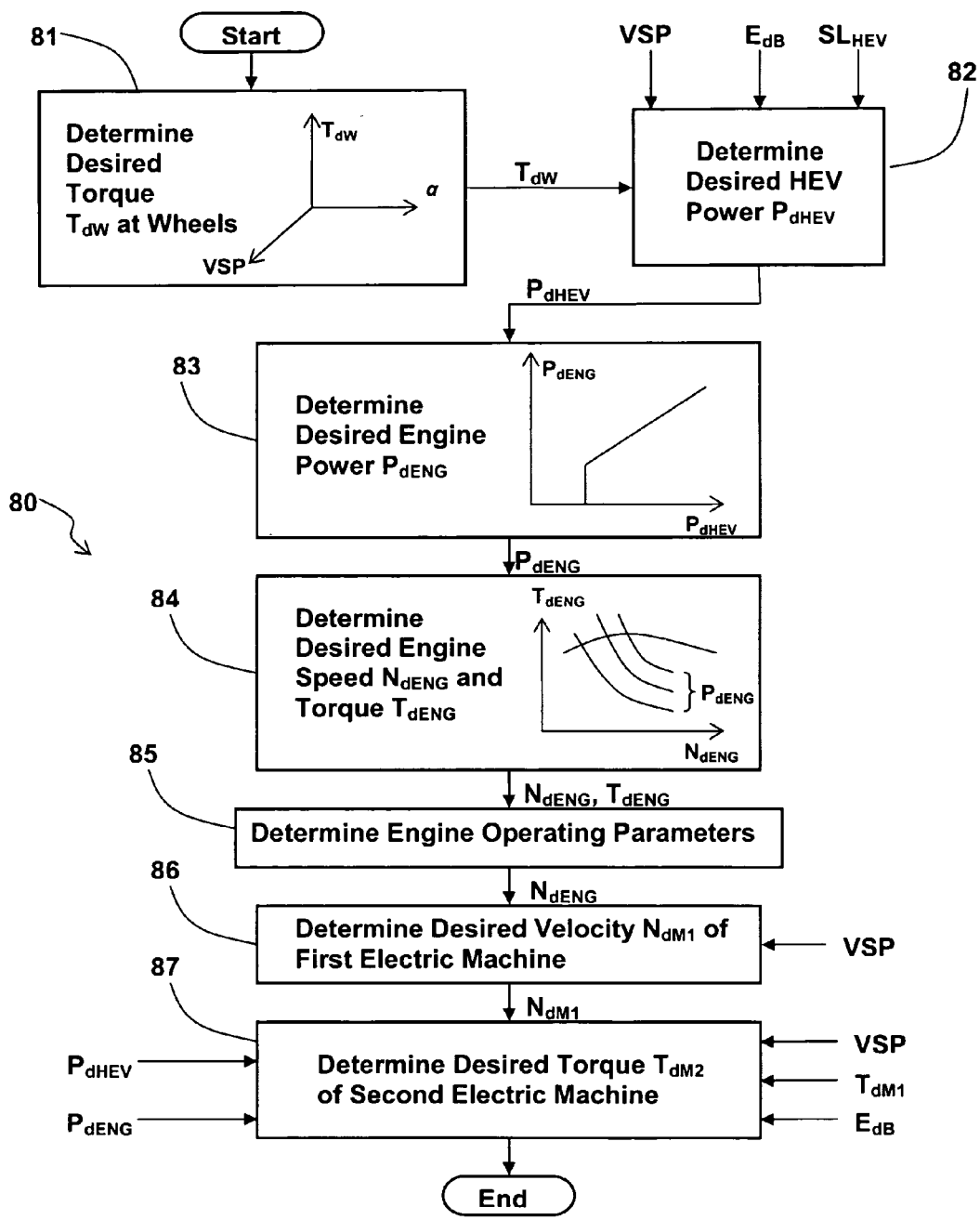
FIG. 8 is a flowchart illustrating a subroutine at the step 72 of FIG. 7 to determine tentative operating parameters of the HEV power-train in accordance with the present embodiment.

FIG. 8 shows a subroutine 80 to determine the tentative operating parameters where in a block 81 at first a desired torque at the driving wheels $T_{dW}$ [Nm] is derived from a map by the accelerator position a and the vehicle speed VSP [m/s]. Then in a next step 82, the desired power $P_{dHEV}$ [kW] from the HEV power-train to the driving wheels is calculated from the determined desired torque at the driving wheels $T_{dW}$ [Nm], the vehicle speed VSP, a desired energy to charge the battery $E_{dB}$ [kW] and an estimated system loss $SL_{HEV}$ [kW] of the HEV power-train. Next a desired engine power $P_{dENG}$ [kW] is determined based on the desired power $P_{dHEV}$ [kW] by looking at a map in a step 83. It proceeds to a step 84 where the set of desired engine speed $N_{dENG}$ and desired engine torque $T_{dENG}$ [Nm] is determined based on the desired engine power $P_{dENG}$ and the engine efficiency as shown in FIG. 6 so as to derive the best engine efficiency at the given desired engine power $P_{dENG}$. The most efficient engine operating point can be where the iso-power curve and the minimum fuel consumption curve cross each other in FIG. 6 where generally the most efficient points are usually just below a maximum torque curve so that air may be almost fully charged into the combustion chamber and a pumping loss of the engine may not be substantial. So, in a next step 85 the subroutine 80 determines based on the engine operating point determined at the step 84 various engine control parameters to be normal values including the fuel injection amount corresponding to the signal FPW, the throttle valve opening TVO to cause the air fuel ratio λ to be equal to one, the intake and exhaust valve opening profiles and the amount of exhaust gas recirculation.

Then the subroutine 80 proceeds to a step 86 where from the desired engine speed $N_{dENG}$ and the vehicle speed VSP, the desired velocity $N_{dM1}$ of the first electric machine 2 may be derived according to the relationship of the equation (1) and the collinear diagram of FIG. 4. Then it proceeds to a step 87 where the desired torque $T_{dM2}$ of the second electric machine 3 may be determined based on a sum of a power generated, if in the positive power-split mode, at the first electric machine 2 derived from the desired torque $T_{dM1}$ and the desired velocity $N_{dM1}$ and an available battery discharge or a required battery charge as electricity available to drive the second electric machine 3 corresponding to the parameter $E_{dB}$ and a difference between the desired HEV power $P_{dHEV}$ [kW] and the desired engine power $P_{dENG}$. Then the subroutine 80 to determine the tentative operating parameters may end to return to the main routine at a step 73.

Now referring back to FIG. 7, in the step 73 the routine determines whether the vehicle is cruising at a relatively high speed by comparing a change Δα of the accelerator position α to a predetermined value $Δα_1$ and comparing the vehicle speed VSP to a predetermined speed $VSP_1$. If it is determined in the step 73 that the change of the accelerator position Δα is not greater than the value $Δα_1$ and the vehicle speed VSP is higher than the speed $VSP_1$, which means the vehicle is cruising at a relatively high speed and may be potentially fallen under the negative power-split mode described above, the routine proceeds to a step 74 where the tentative operating parameters determined in the step 72 by going through the subroutine 80 of FIG. 8 are updated by going through a subroutine 90 of FIG. 9 if the expected efficiency of the HEV power-train derived from the tentative operating parameters is relatively low.

Figure 9:
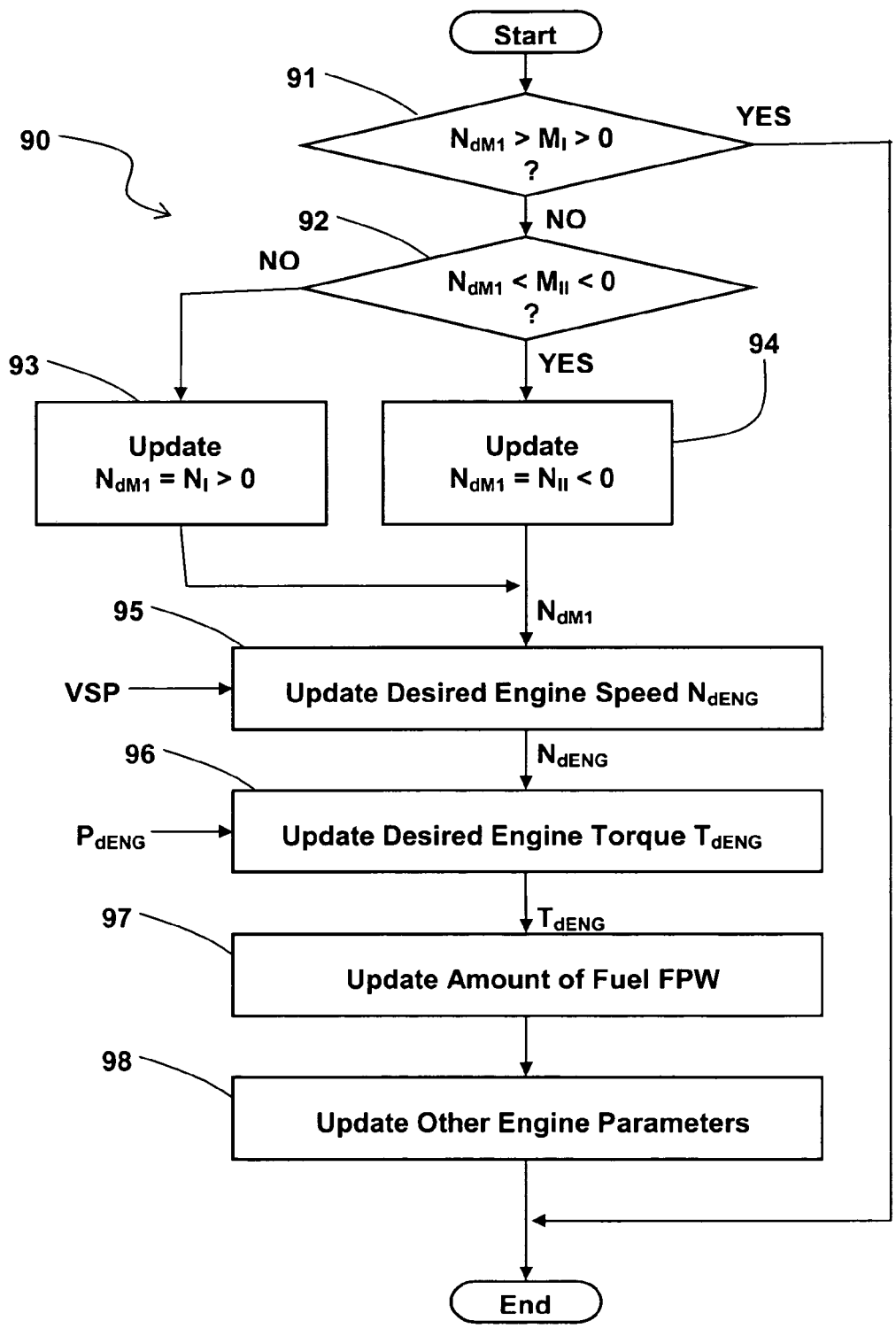
FIG. 9 is a flowchart illustrating a subroutine at the step 74 of FIG. 7 to update the operating parameters of the HEV power-train tentatively determined in FIG. 8.

FIG. 9 shows a subroutine 90 to update the operating parameters tentatively determined in the subroutine 80 of FIG. 8. In a step 91 the desired velocity $N_{dM1}$ of the first electric machine 2 is compared to a predetermined value $N_I$ which is positive or larger than zero such as 10 rpm. The predetermined value $N_I$ may be determined considering both of operating efficiency of the first electric machine 2 which is the worst at the velocity zero and electromechanical conversion efficiency between the first electric machine 2 and the second electric machine 3 and/or the battery 5. If the desired velocity $N_{dM1}$ is greater than the value $N_I$, the sun gear 12 connected to the first electric machine 2 is rotating in the same direction as the planetary carrier 14 connected to the engine 1 at a certain speed not zero, which means the HEV power-train is taking a positive power-split mode and no substantial loss is imposed so that any update on the operating parameters is necessary and the subroutine 90 may end. Conversely if the desired velocity $N_{dM1}$ of the first electric machine 2 is not greater than the value $N_I$ in the step 91, in other words the desired engine speed $N_{dENG}$ has become relatively low according to the relationship in the equation (1) and the collinear diagram of FIG. 5, which results from the relatively low load or desired power $P_{dHEV}$ of the HEV power-train, the subroutine 90 proceeds to a step 92 where the desired velocity $N_{dM1}$ of the first electric machine is compared to a second predetermined value $N_{II}$ which is negative value such as −10 rpm. If the desired velocity $N_{dM1}$ is greater than the value $N_{II}$, which means the desired velocity $N_{dM1}$ falls within a range between the first and second predetermined values $N_I$ and $N_{II}$ including zero, the desired velocity $N_{dM1}$ of the first electric machine 2 is updated to be the first predetermined value $N_I$ in a step 93 as shown by a solid line in FIG. 5, resulting in an increase of the desired engine speed $N_{dENG}$ according to the equation (1). By doing so, the first electric machine 2 is expected to rotate in a positive direction same as the engine 2 which means the positive power-split mode may occur, no torque circulation may occur and the velocity zero or the worst efficiency point of the first electric machine 2 may be avoided. Conversely if the desired velocity $N_{dM1}$ is less than the value $N_{II}$ in the step 92, the subroutine 90 proceeds to a step 94 where the desired velocity $N_{dM1}$ is updated to be the second predetermined value $N_{II}$ such as −10 rpm as shown by a dot-dashed line in FIG. 5. It means although still a negative power-split mode or torque circulation occurs, its extent is minimum and also the worst efficiency point of the first electric machine 2 may be avoided, resulting in an increase of the desired engine speed $N_{dENG}$ in accordance with the relationship of the collinear diagram of FIGS. 4 and 5. The predetermined value $N_{II}$ may be determined as close as possible to zero considering the operating efficiency of the first electric machine 2 which is the worst at the velocity zero. To avoid oscillations of the desired velocity $N_{dM1}$ between $N_I$ and $N_{II}$ of the first electric motor 2 determined in the steps 93 and 94, a correction can be implemented therein such as a hysteresis control, a delay control and any other appropriate control known in the art.

Once the desired velocity $N_{dM1}$ of the first electric machine 2 is updated in either of the steps 93 or 94, the subroutine proceeds to a step 95 where the desired engine speed $N_{dENG}$ is updated based on the updated desired speed $N_{dM1}$ of the first electric machine 2 and the vehicle speed VSP by using the relationship of the equation (1) and the collinear diagram of FIG. 5. In a next step 96, the desired engine torque $T_{dENG}$ is updated by dividing the desired engine power $P_{dENG}$ determined in the step 83 with the updated desired engine speed $N_{dENG}$. Then the fuel injection signal FPW is updated based on the updated desired engine torque $T_{dENG}$, generally decreased proportionally to the desired engine torque decrease caused by the engine speed increase, in a step 97.

If the intake airflow to the engine were regulated or the pressure in the intake manifold 23 were decreased in proportion to the decrease of the signal FPW, the engine efficiency would be deteriorated or the pumping losses would be increased as shown in FIG. 6. To avoid this drawback, measures can be taken to maintain the intake manifold pressure such as within 0.1 bar from an intake manifold pressure which achieves the minimum fuel consumption, specifically to place lower the minimum fuel consumption curve shown in FIG. 6. In a step 98, one or more of the engine operating parameters determined in the step 85 are updated to maintain the intake manifold pressure, as described below.

If the engine 2 and its exhaust gas after-treatment system including the catalyst converter 59 allows a combustion with a lean air fuel ratio or air excessive ratio λ greater than 1, the desired throttle opening TVOd can be updated to be maintained as tentatively determined in the step 85, unless it exceeds a lean limit at which a combustion stability falls beyond a tolerable level to cause a misfire of the fuel and which is generally greater in a case of fuel to be combusted being hydrogen. When the injectors 21 supply fuel equally to all of the cylinders 51 and the expected in-cylinder air fuel ratio reaches the lean limit, fuel injection signals FPW for some of the multiple cylinders 51 may be updated to be zero and the rest of the signals FPW may be updated so that the rest of the cylinders 51 may generate the desired engine torque $T_{dENG}$, which may lead to a better combustion stability while still maintaining the intake manifold pressure.

If the lean air fuel ratio is not generally tolerated in the exhaust gas after-treatment system or it is already reached to the lean limit, the desired amount of the exhaust gas re-circulation (EGRd) can be increased unless it exceeds an EGR limit at which combustion stability falls beyond a tolerable level due to inert gas in the EGR, and which is greater in the case of fuel to be combusted being hydrogen because of its higher combustion stability with less possibility of misfire. Alternatively, the amount of EGR can be controlled by updating the intake and/or exhaust valve opening profiles as described below. Also in the situation where the air fuel ratio λ or the desired EGR amount EGRd can not be changed any more, the valve opening profiles may be updated to maintain the intake manifold pressure, as described below.

Figure 10:
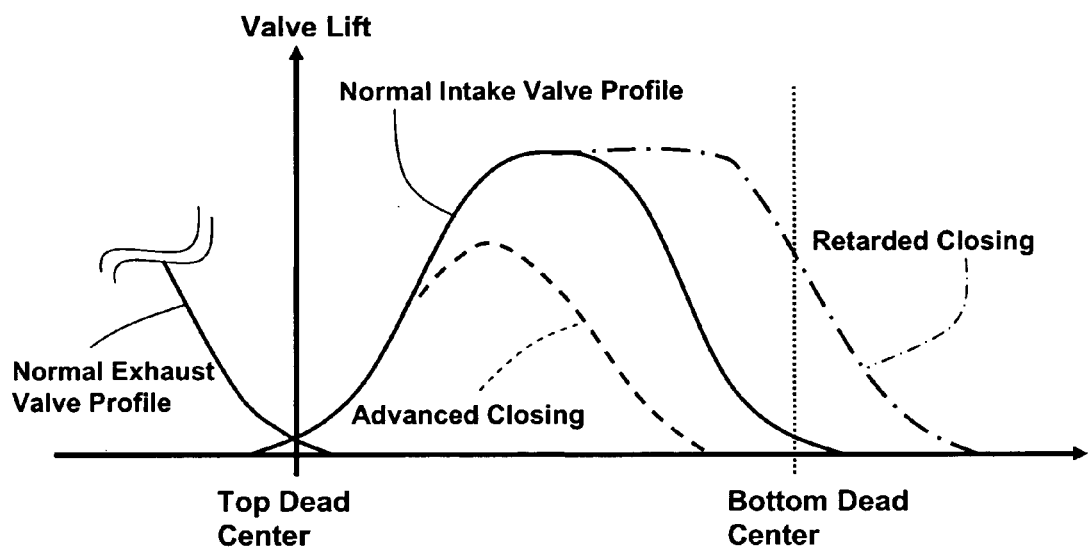
FIG. 10 is a diagram illustrating a valve opening profile and its change in accordance with an embodiment of the present description.

When the opening timing of the intake valve 54 can be varied from a normal intake valve profile shown by a solid line in FIG. 10, the intake airflow can be regulated while maintaining the intake manifold pressure by retarding the opening phase of the intake valve so that the intake valve closes well after the bottom dead center of its piston so as further to push back the air in the combustion chamber 51 to the intake manifold 23 or advancing the opening phase of the intake valve so that it can close well before the bottom dead center so as to shorten the effective intake period and so that it can open well before the top dead center which is the end of the exhaust stroke so as to increase amount of residual combusted gas or internal EGR by inducing the combusted gas from the combustion chamber 51 to the intake manifold 23 then inducting again to the combustion chamber 51. To further increase the internal EGR, the opening phase of the exhaust valve 55 may be advanced so that it can close well before the top dead center so as to retain the combusted gas in the combustion chamber 51.

When valve lift itself can be fully varied in such as the electromagnetic valve actuators 61 and 62 shown in FIG. 3 or the variable valve lift mechanism based on the variable cam timing mechanism, any one of the opening and closing timings of the valves can be fully varied without varying other of the timings. In those mechanisms, to maintain the intake manifold pressure without changing the air fuel ratio λ, the valve opening profile can be changed from the normal profile to an early intake valve closure profile or a late intake valve closure profile in FIG. 10. Also by varying the opening timing of the intake valve and/or the closing timing of the exhaust valve, amount of the residual combusted gas or the internal EGR can be controlled in parallel to the intake air charge control by the intake valve closing.

Further when the variable valve lift mechanism such as electromagnetic valve actuators 61 and 62 is installed individually in multiple cylinders 51, the intake or exhaust valves 54, 55 of some of the cylinders can be held closed. By doing so while the fuel into those cylinders is shut off and the fuel injection signal FPW for the rest of the cylinders is updated so that the rest of the cylinders may generate the desired torque $T_{dENG}$ as described above, which is called a cylinder deactivation, the air charge as well as the pumping loss can be regulated. By doing so, the fueled cylinders may operate respectively with the same minimum air charge as that in all the cylinders operating, which may further lower the minimum fuel consumption curve in FIG. 6, or with greater air charge compared to that in all the cylinder operating, which may improve stability or robustness of the engine rotation in a certain engine operating condition such as a lower load condition, where that kind of concern may be perceived. Further it is also beneficial for exhaust gas purification since the excess oxygen ratio can be kept at the stoichimetric which is optimum for the exhaust gas after-treatment system. As such, the valve opening control and the cylinder deactivation can be combined for a specific engine operating condition to achieve the best efficiency and other considerations such as the engine stability or robustness.

It is needless to say that the above described measures to maintain the intake manifold pressure can be combined considering a configuration of exhaust gas after-treatment system or any other engine system design factors.

By updating the engine operating parameters in the step 98 as described above, the minimum fuel consumption curve will be put lower and correspondingly the engine operating point will be updated along the iso-power curve toward less torque and higher engine speed side in FIG. 6.

Then, the subroutine 90 ends or the step 74 of the main routine 70 is completed. Referring back to FIG. 7, from the steps 73 or 74, the routine proceeds to a step 75 when the routine now has all the operating parameters of the HEV power-train determined in the step 72 or updated in the step 74. In the step 75, the first electric machine 2 is feedback controlled to rotate at the desired velocity $N_{dM1}$ by controlling the inverter 4 with the controller 31. Then in a next step 76, the second electric machine 3 is controlled to generate the desired torque $T_{dM2}$ determined in the step 72 also by controlling the inverter 4 with the controller 31. Finally in a step 76, the engine 1 is controlled based on the engine operating parameters determined or updated in the steps 72 or 74. Finally the routine 70 returns to the start and repeats the process.

As may be realized by those skilled in the art, it is intended that the sequence of the processing steps described above is merely for illustrative and exemplary purposes and that a different sequence or simultaneous or parallel processing may be possible as long as the intended result can be obtained from such a processing.

Further, it is needless to say that this invention is not limited to the illustrated embodiment and that various improvements and alternative designs are possible without departing from the substance of this invention as claimed in the attached claims.

The invention claimed is:

1. A method for controlling a power-train of a hybrid electric vehicle comprising an internal combustion engine, an electric machine and a transmission, said transmission having a gear set with three rotational elements that are rotationally coupled to said internal combustion engine, said electric machine, and the vehicle driving wheel, the rotational velocity of any one of said three rotational elements being mechanically defined by the rotational velocity of the remainder of said three rotational elements, the method comprising:

adjusting the torque of said electric machine to change the speed of said internal combustion engine and to control the velocity of said electric machine above a predetermined value; and decreasing the torque of said internal combustion engine while substantially maintaining the intake manifold pressure of said internal combustion engine in response to a decrease in the demanded engine output.

2. The method as described in claim 1, wherein said predetermined value of the velocity of said electric machine is different than zero.

3. The method as described in claim 2, wherein said predetermined value comprises two values positive and negative.

4. The method as described in claim 3, wherein said two predetermined values are selected in accordance with the current velocity of said electric machine.

5. The method as described in claim 1, wherein said decreasing the engine torque comprises decreasing the fuel into a combustion chamber of said internal combustion engine and making air fuel ratio in said combustion chamber to be leaner in accordance with said decreasing the fuel.

6. The method as described in claim 5, wherein hydrogen is supplied to said internal combustion engine as said fuel.

7. The method as described in claim 1, wherein said decreasing the engine torque comprises shutting off fuel into some of multiple cylinders of said internal combustion engine.

8. The method as described in claim 7, further comprising increasing fuel into the remainder of the cylinders of said internal combustion engine.

9. The method as described in claim 1, wherein said decreasing the engine torque comprises decreasing the fuel to a combustion chamber of said internal combustion engine and reintroducing exhaust gas to said combustion chamber in accordance with said decreasing the fuel.

10. The method as described in claim 9, wherein said reintroducing the exhaust gas comprises re-circulating the exhaust gas from an exhaust system to an intake system of said internal combustion engine.

11. The method as described in claim 9, wherein said reintroducing the exhaust gas comprises controlling an intake or exhaust valve timing so as to increase an overlapping period when both of the intake and exhaust valves open.

12. The method as described in claim 9, wherein said reintroducing the exhaust gas comprises controlling an exhaust valve timing so as to advance closing of said exhaust valve.

13. The method as described in claim 1, wherein said reducing the engine torque comprises controlling an intake valve timing so as to decrease a cylinder air charge of said internal combustion engine.

14. The method as described in claim 13, wherein said controlling the valve timing comprises advancing a closing timing of an intake valve before the bottom dead center at an end of an intake stroke of the cylinder.

15. The method as described in claim 13, wherein said controlling the valve timing comprises retarding a closing timing of an intake valve after the bottom dead center at an end of an intake stroke of the cylinder.

16. The method as described in claim 1, wherein said decreasing the engine torque comprises shutting off fuel into some of multiple cylinders of said internal combustion engine and holding closed an intake or exhaust valves of said some of cylinders.

17. The method as described in claim 16, further comprising increasing fuel into the remainder of the cylinders of said internal combustion engine.

18. A hybrid electric vehicle power-train comprising:

an internal combustion engine having an intake manifold introducing air into its combustion chamber;

a first electric machine;

a transmission having a gear set with three rotational elements rotationally coupled respectively to said internal combustion engine, said first electric machines and the vehicle driving wheel, a rotational velocity of any one of said three rotational elements being mechanically defined by the rotational velocity of the remainder of said three rotational elements; and a controller configured to adjust the torque of said first electric machine to change the speed of said internal combustion engine and to control the velocity of said first electric machine above a predetermined value; and decrease the torque of said internal combustion engine while substantially maintaining the intake manifold pressure of said internal combustion engine in response to a decrease in the demanded engine output.

19. The hybrid electric vehicle power-train as described in claim 18, further comprising a second electric machine mechanically and rotationally coupled with said vehicle wheel and electrically coupled with said first electric machine.

20. The hybrid electric vehicle power-train as described in claim 19, wherein said internal combustion engine uses hydrogen as its fuel.

* * * * *